(12) United States Patent
Kojima et al.

(10) Patent No.: US 8,377,374 B2
(45) Date of Patent: Feb. 19, 2013

(54) HYDROGEN-ABSORBING ALLOY AND ELECTRODE FOR NICKEL-METAL HYDRIDE SECONDARY BATTERIES

(75) Inventors: Yasushi Kojima, Myoko (JP); Hiroyuki Ikeda, Myoko (JP); Satoru Furukawa, Myoko (JP); Kazutaka Sugiyama, Myoko (JP); Nobuo Kobayashi, Myoko (JP)

(73) Assignee: Chuo Denki Kogyo Co., Ltd., Niigata (JP)

( * ) Notice: Subject to any disclaimer, the term of this patent is extended or adjusted under 35 U.S.C. 154(b) by 558 days.

(21) Appl. No.: 12/525,000

(22) PCT Filed: Jun. 7, 2007

(86) PCT No.: PCT/JP2007/061523
§ 371 (c)(1),
(2), (4) Date: Feb. 24, 2010

(87) PCT Pub. No.: WO2008/093437
PCT Pub. Date: Aug. 7, 2008

(65) Prior Publication Data
US 2012/0001131 A1   Jan. 5, 2012

(30) Foreign Application Priority Data
Jan. 30, 2007  (JP) ................. 2007-019938

(51) Int. Cl.
*C22C 19/03* (2006.01)
(52) U.S. Cl. ............. 420/455; 252/519.15; 420/441; 420/459; 420/460; 429/209; 429/218.2; 429/223; 429/224; 429/405

(58) Field of Classification Search ............. 252/519.15; 423/644; 429/209, 218.2, 223, 224, 405; 420/441, 455, 459, 460
See application file for complete search history.

(56) References Cited

FOREIGN PATENT DOCUMENTS

| | | |
|---|---|---|
| JP | 09-213319 A | 8/1997 |
| JP | 10-025529 A | 1/1998 |
| JP | 2003-229120 A | 8/2003 |
| JP | 2005-133193 A | 5/2005 |
| WO | 03/054240 A1 | 7/2003 |

OTHER PUBLICATIONS

Machine translation of JP 2005-133193, 2005.*
Chen, Jinzhou, "Design of Hydrogen Storage Alloy Testing System & Ni-MH Battery Management System", Chinese Academy of Sciences, Shanghai Institute of Microsystem and Information Technology, Jun. 2004, (5 pp.), English translation (9 pp.).

* cited by examiner

*Primary Examiner* — Harold Pyon
*Assistant Examiner* — Haidung Nguyen
(74) *Attorney, Agent, or Firm* — The Webb Law Firm

(57) ABSTRACT

A hydrogen-absorbing alloy, which is used as a negative electrode material of nickel-metal hydride secondary batteries for hybrid electric vehicles, and particularly for batteries to drive electric motors of hybrid electric vehicles, is an $AB_5$-type alloy having a $CaCu_5$-type crystal structure and the general formula $RNi_aCo_bAl_cMn_d$ (R: mixture of rare earth metals), wherein $4.15 \leq a \leq 4.4$, $0.15 \leq b \leq 0.35$, $1 \leq c/d \leq 1.7$, $5.25 \leq a+b+c+d \leq 5.45$.

7 Claims, No Drawings

HYDROGEN-ABSORBING ALLOY AND ELECTRODE FOR NICKEL-METAL HYDRIDE SECONDARY BATTERIES

FIELD OF THE INVENTION

The present invention relates to a hydrogen-absorbing alloy which is used as a negative electrode material of nickel-metal hydride secondary batteries (referred to below as "Ni/MH batteries"), and an electrode for Ni/MH batteries using the alloy.

The present invention particularly relates to a hydrogen-absorbing alloy which is used as a negative electrode material for large and prismatic Ni/MH batteries for electric drive motors of hybrid electric vehicles, and an electrode for Ni/MH batteries using the alloy.

BACKGROUND ART

Ni/MH batteries in which a hydrogen-absorbing alloy is used as a negative electrode material were commercialized in the first half of the 1990's, and their use subsequently spread widely.

Ni/MH batteries were initially employed as electric power supplies of mobile phones and personal computers.

Since then, small and lightweight lithium ion batteries have gradually replaced Ni/MH batteries in these fields.

Ni/MH batteries are now used in toys, digital cameras, motor-assisted bicycles, power tools, and hybrid electric vehicles because they have a good balance among their characteristics such as economy, safety, and electric energy density.

Among such batteries, large and prismatic Ni/MH batteries for electric drive motors of hybrid electric vehicles particularly need a high level of performance.

First of all, the Ni/MH batteries for electric drive motors of hybrid electric vehicles need excellent high-rate discharge characteristics in order to drive electric motors which move a vehicle body weighing more than 1 ton.

Additionally, since the conditions in which hybrid electric vehicles are used are much more severe than the conditions in which an ordinary household appliance is used, it is essential that the batteries maintain high power at low temperatures, such as in a subfreezing environment.

Furthermore, because batteries for hybrid electric vehicles are functional components affecting human lives, the batteries must guarantee a much higher degree of safety for a prolonged period than batteries used in portable devices.

In order to obtain Ni/MH batteries having such excellent characteristics, the hydrogen-absorbing alloy used as a negative electrode material of the batteries must have a specially designed composition.

A general-purpose hydrogen-absorbing alloy used for Ni/MH batteries is an R-based R—Ni—Co—Al—Mn alloy system, in which R is a mixture of rare earth metals.

This alloy is an $AB_5$-type hydrogen-absorbing alloy having a $CaCu_5$-type crystal structure, and its typical composition is $LaNi_5$.

This alloy is a multi-component alloy in which the balance among various characteristics can be adjusted by the substitution of a part of La by light rare earth elements such as Ce, Pr, and Nd, and/or by the substitution of a part of Ni by metallic elements such as Co, Al, and Mn.

However, it is generally considered to be difficult for the basic R—Ni—Co—Al—Mn alloy (referred to below as the "basic alloy composition") to improve battery characteristics as a whole only by adjustment of the molar ratio of each element.

For example, the easiest way to obtain Ni/MH batteries having a high power density when an alloy having the basic alloy composition is employed is to decrease the content of Co and/or to increase the content of Mn.

However, it is well-known that doing so worsens other characteristics of Ni/MH batteries, especially the cycle life.

Therefore, when an alloy having the basic alloy composition is employed as a negative electrode material of Ni/MH batteries, it is typical to select certain characteristics as critical taking into consideration the application of the batteries and then to employ an alloy composition which can improve only the selected characteristics.

Thus, even if a certain alloy is categorized as "an alloy having the basic alloy composition", the molar ratio of each element of the alloy can vary widely depending upon which characteristics of the batteries are selected as critical, and hence the characteristics of the alloy are naturally different from each other.

Also, it is often the case that an alloy applied to a certain use has excellent characteristics which are selected for that use while the other characteristics are allowed to be inferior.

For example, an alloy which exhibits excellent cycle life for some applications may not have a good energy density and/or high-rate characteristics.

Conversely, some applications may require an alloy to have good high-rate discharge characteristics even if the cycle life of the alloy is not so good.

However, there are many cases in which several characteristics of an alloy must be simultaneously improved in order to meet the requirements of the application of the alloy.

To respond to the need to simultaneously improve several characteristics, it has been proposed to add one or more elements other than elements constituting the basic alloy composition, or to adjust some control parameters of characteristics other than the alloy composition even when the alloy has the basic alloy composition of the basic alloy composition.

For example, Patent Document 1 discloses selecting a non-stoichiometric composition in which the B site is relatively rich, and at the same time, adding a small amount of elements such as Fe, Cr, and Cu.

Patent Document 2 suggests reducing impurities such as Mg, Pb, and Cl in order to improve the high-rate discharge characteristics, i.e., the high-rate characteristics of the alloy.

Patent Document 3 discloses an alloy, which has the basic composition, has a crystal structure which is defined precisely so as to improve several characteristics.

Patent Document 1: JP09-213319A
Patent Document 2: JP10-25529A
Patent Document 3: WO2003/054240

DISCLOSURE OF THE INVENTION

However, the addition of Fe, Cr, Cu and the like as disclosed in Patent Document 1 increases the risk of local corrosion of the alloy caused by the added elements.

Therefore, such an approach makes it difficult to guarantee the safety of hybrid electric vehicles for a prolonged period, which is one of the important requirements when an alloy is employed in vehicles.

The approaches of reducing impurities of an alloy and selecting the crystal structure of the alloy precisely as disclosed in Patent Documents 2 and 3, respectively, cause the problem that productivity is decreased because the manufacturing process for the alloy becomes complicated.

Furthermore, it is not at all clear whether the alloy disclosed in Patent Document 3 satisfies the requirements for low-temperature discharge characteristics of Ni/MH batteries for hybrid electric vehicles, because that alloy is not intended to improve low-temperature discharge characteristics.

The object of the present invention is to provide a hydrogen-absorbing alloy which can improve high-rate discharge characteristics and initial activity, suppress an increase in hydrogen equilibrium pressure, and improve low-temperature discharge characteristics of Ni/MH batteries which are power supplies for electric motors of electric hybrid vehicles, and also to provide a negative electrode using the alloy.

The present inventors recognized that the alloy should have a composition of an R—Ni—Co—Al—Mn system, i.e., the basic alloy composition, from the viewpoint of ensuring high safety for a prolonged period.

Based on this recognition, the present inventors carefully investigated how high-rate discharge characteristics, low-temperature discharge characteristics, initial characteristics, and plateau pressure are influenced by the variation of each element of the basic alloy composition.

In particular, it was investigated how the above-described characteristics are influenced by the variation of the molar ratio of Co. The molar ratio of Co is very important in order to reduce the production costs of the alloy because the cost decreases when the molar is low.

As a result of the investigation, it was found that an increase in the molar ratio of Mn hardly contributes to an improvement of high-rate discharge characteristics when the molar ratio of Co is 0.35 or less.

Based on the above-described discovery, the present invention was achieved by investigations as to how the various above-described characteristics are influenced by the molar ratio of Al to Mn and the molar ratio of other elements of the alloy.

Namely, the present invention is a hydrogen-absorbing alloy characterized by having the general formula

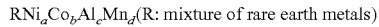

$RNi_aCo_bAl_cMn_d$ (R: mixture of rare earth metals)

wherein $4.15 \leq a \leq 4.4$, $0.15 \leq b \leq 0.35$, $1 \leq c/d \leq 1.7$, $5.25 \leq a+b+c+d \leq 5.45$, preferably $4.15 \leq a \leq 4.4$, $0.20 \leq b \leq 0.35$, $1 \leq c/d \leq 1.7$, $5.30 \leq a+b+c+d \leq 5.45$, and a negative electrode using the alloy for Ni/MH batteries, and use of the electrode in Ni/MH batteries for electric motors of hybrid electric vehicles.

As other aspects, the present invention includes a Ni/MH battery for a hybrid electric vehicle comprising the above-described negative electrode, a drive arrangement for a hybrid electric vehicle comprising the above-described Ni/MH battery and an electric motor, and a hybrid electric vehicle having the above-described drive arrangement.

Local corrosion of the alloy is less likely to occur, because the alloy according to the present invention has the basic alloy composition.

In addition, controlling the production of the alloy is relatively easy because the alloy is free from constraints concerning its crystal structure.

Therefore, the quality of the alloy is less likely to vary during its manufacture as well as during its processing.

The alloy according to the present invention can impart superior low-temperature and high-rate characteristics to Ni/MH batteries compared to ordinary alloys when the molar ratio of Co in both alloys is the same.

Conversely, it is possible for the alloy to have a much higher molar ratio of Co than in ordinary alloys when the high-rate characteristics of batteries are of the same level.

Therefore, such Ni/MH batteries exhibit excellent cycle life when the alloy according to the present invention is used as a negative electrode material.

A hydrogen-absorbing alloy according to the present invention can provide Ni/MH batteries which can be safely operated for a prolonged period and can also exhibit excellent low-temperature, high-rate, and, initial characteristics.

A drive arrangement comprising the above-described Ni/MH batteries and hybrid electric vehicles having the above-described drive arrangement can exhibit excellent performance.

BEST MODE FOR CARRYING OUT THE INVENTION

Preferred embodiments of a hydrogen-absorbing alloy according to the present invention and a negative electrode for Ni/MH batteries using the alloy are as follows.
[Alloy Composition]

A hydrogen-absorbing alloy according to the present embodiment is an $AB_5$-type alloy having a $CaCu_5$-type crystal structure. The general formula of the alloy is $RNi_aCo_b Al_cMn_d$, wherein $4.15 \leq a \leq 4.4$, $0.15 \leq b \leq 0.35$, $1 \leq c/d \leq 1.7$, and $5.25 \leq a+b+c+d \leq 5.45$.

Metal elements comprising the A site will first be explained.

In the hydrogen-absorbing alloy according to the present embodiment, all or a part of La constituting the A site is substituted by a misch metal (Mm, comprising 40 to 60 mass % of Ce, 10 to 40 mass % of La, and rare earth metals such as Nd).

Next, metal elements comprising the B site will be explained.

In the hydrogen-absorbing alloy according to the present embodiment, Ni, Co, Al, and Mn are used as metal elements constituting the B site. The molar ratios of these elements must satisfy the following requirements.

The molar ratio of Co, i.e., "b", must satisfy $0.15 \leq b \leq 0.35$ and the molar ratio of Al, i.e., "c", must be greater than or equal to the molar ratio of Mn, i.e., "d", and they must satisfy the relationship $1 \leq c/d \leq 1.7$.

When the alloy has the basic alloy composition, the cycle life of a battery usually shows a tendency to decrease when the molar ratio of Co, i.e., "b" is in the range from 0.15 to 0.35.

As a countermeasure against this tendency, it is customary to increase the molar ratio of Ni while the alloy the basic alloy composition and/or to add Fe, Cu, and the like to the alloy resulting in the composition falling outside of the basic alloy composition.

Such countermeasures cause a deterioration of other characteristics of batteries, such as an increase in the hydrogen absorbing and desorbing pressure and a decrease in corrosion resistance.

However, it becomes possible for the molar ratio of Co of the hydrogen-absorbing alloy according to the present embodiment to be 0.35 or less without increasing in the molar ratio of Ni, because the alloy satisfies $1 \leq c/d \leq 1.7$.

The value of c/d is determined to be 1 or more based on the following considerations.

An increase in the molar ratio of Mn contributes little to improving high-rate discharge characteristics when the molar ratio of Co is 0.35 or less.

An increase in the molar ratio of both Al and Mn reduces the plateau pressure. Of these elements, Mn is corrosion-prone in an alkali solution, and this corrosion worsens the characteristics of batteries. Al has an effect of reducing pulverization of the alloy.

Accordingly, an increase in the molar ratio of Al is more effective at improving battery characteristics than is an increase in the molar ratio of Mn when the molar ratio of Co is 0.35 or less.

On the other hand, when the value of c/d is more than 1.7, the hydrogen absorbing capacity of the alloy falls, and the batteries have a pronounced decrease in their essential characteristics.

Consequently, when the molar ratio of Co is 0.15 to 0.35 and the value of c/d is 1 to 1.7, overall battery characteristics can be improved, especially low-temperature discharge characteristics and high-rate discharge characteristics.

A preferred range for the value of c/d is 1.2 to 1.7.

An alloy for which the value of c/d is in the above-described range can exhibit excellent characteristics as long as the molar ratio of Co, i.e., "b" is in the range of 0.15 to 0.35 and more preferably in the range of 0.3 to 0.35.

When the molar ratio of Co, i.e., "b" is outside the range of 0.15 to 0.35, it is difficult for a battery to exhibit excellent characteristics even if the value of c/d is in the range of 1 to 1.7.

When "b" is more than 0.35, high-rate discharge characteristics, low-temperature discharge characteristics, and initial characteristics are deteriorated.

When "b" is less than 0.15, other problems such as a decrease in the cycle life of a battery occur because of an insufficient amount of Co.

In the hydrogen-absorbing alloy according to the present embodiment, the molar ratio of Ni, i.e., "a", satisfies $4.15 \leq a \leq 4.4$, and the total value of the molar ratio of the B site elements satisfies $5.25 \leq a+b+c+d \leq 5.45$, in addition to satisfying the above-described requirements regarding the molar ratios of Co, Al, and Mn.

These parameters can not be selected independently and are determined by taking into account the relationship between the molar ratios of Al and Mn, which can vary the plateau pressure, which is a basic index of hydrogen-absorbing alloys.

Based on these considerations, it is most preferable that "b" be in the range of 0.3 to 0.35, the value of c/d be in the range of 1.2 to 1.7, "a" be in the range of 4.15 to 4.20, and the sum of a, b, c, and d be in the range of 5.35 to 5.45.

[Production of Alloy Powders]

Any method disclosed in the prior art may be employed for manufacturing powders of the hydrogen-absorbing alloy according to the present embodiment.

For example, a mechanical crushing and pulverizing process of the alloy may be as follows.

The metallic raw materials are weighed so as to have a prescribed weight, and then they are mixed.

The mixture is melted by any known heating method, such as a high frequency induction heating method or a plasma arc method.

The resulting melt is cast into a mold and cooled to obtain an alloy ingot, which may be subjected to additional heat treatment after cooling.

Instead of cooling in a mold, a rapid cooling method by roll quenching may be employed to form a thin plate of the alloy.

Next the resulting alloy ingot and/or alloy thin plate is subjected to grinding or is pulverized to obtain a powder of the alloy.

Either a dry method or a wet method may be used for this grinding step.

When a dry grinding method is employed, an impact grinder or an attrition mill may be used.

Specific examples of an impact grinder include a pin mill and a jet mill. When the alloy is in the form of an ingot, it is preferable to crush the alloy coarsely before grinding.

A dry grinding method is preferably performed in an inert atmosphere.

When a wet grinding method is employed, alloy powders having a prescribed average diameter may be obtained by grinding in a ball mill with a solvent such as alcohol.

When there is concern of contamination by impurities during the above-described grinding step, an atomizing method may be employed.

A jet stream of air, water, an inert gas, or the like can form a molten metal into fine droplets of the melt. An alloy powder is obtained by solidification of the droplets.

Alternatively, alloy powders may be obtained by pouring a melt onto a high speed rotating disk to form fine droplets of the melt by a shearing force caused by centrifugal force.

[Ni/MH Battery]

There is no limitation on a method of manufacturing a Ni/MH battery using the hydrogen-absorbing alloy according to the present embodiment, and any known method can be employed for its manufacture. An example of a manufacturing process is described below.

First, a negative electrode using the hydrogen-absorbing alloy according to the present embodiment is manufactured.

The alloy is ground and/or pulverized by a known method as described above.

The alloy powder is processed to form a paste, which preferably contains a resin glue and an electroconductive powder as needed.

A negative electrode is prepared by coating the paste onto an electroconductive core or by filling the core with the paste.

Examples of the resin glue include styrene-butadiene copolymer, sodium polyacrylate, polytetrafluoroethylene (PTFE), polystyrene (PS), carboxymethylcellulose (CMC), and salts of carboxymethylcellulose.

The content of the resin glue in the paste is preferably 0.5 to 5 parts by weight based on 100 parts of the alloy powder, and it is especially preferable that the content be 0.5 to 1 parts by weight.

Examples of electroconductive powders include Ni powders, carbon black, and graphite.

The content of the electroconductive powder in the paste may be selected based on not only the electroconductivity of the powder but also on the characteristics of the alloy and the conditions of use of batteries.

Examples of the electroconductive core include a member having a two-dimensional structure such as a punched metal, an expanded metal, or a metallic wire gauze, or a member having a three-dimensional structure such as a foamed metal or sintered metallic fibers in the form of a mesh.

Examples of the material of the electroconductive core include nickel and a nickel-plated steel plate.

A positive electrode may be manufactured by coating a paste, which contains nickel hydroxide and additives such as a cobalt oxide and resin glues as needed, onto an electroconductive core such as a punched metal substrate, a sintered fiber substrate, a foamed metal, or the like, or by filling the core with the paste.

A positive electrode may also be manufactured by filling a core with the paste.

The resin glues used in the positive electrode may be the same as is used for the negative electrode.

The negative electrode and the positive electrode, between which is disposed a separator made of a polyamide nonwoven fabric and/or a polyolefin nonwoven fabric, for example, are placed into a sealed package having a safety valve.

A battery can be formed by filling the above-described package with an alkaline electrolyte, which may contain one or more of KOH, NaOH, and LiOH.

The specific gravity of the electrolyte is 1.2 to 1.4 g/cm$^3$, as indicated in the prior art.

EXAMPLES

Although the effects of the present invention will be described below with respect to examples, the present invention should not be considered to be limited to these examples.

Examples 1 to 5, Comparative Examples 1 to 5, and Reference Examples 1-1 to 2-2

Each of the raw material metals, namely, R, Ni, Co, Al, and Mn was weighed to obtain the alloy compositions shown in Table 1.

These raw materials were placed into a crucible in a furnace. The furnace was first evacuated and then filled with argon gas.

The raw materials were heated with a high frequency induction heater to 1300 to 1600° C. The resulting melt was poured into a metallic mold to perform a casting step.

The melt was cooled to 150° C. or below in the mold to obtain an ingot of the alloy. The ingot was subjected to heat treatment at 1000° C. for 10 hours in argon gas, i.e., an inert gas, atmosphere.

After the heat treatment, the ingot was crushed to a coarse size by a crusher in nitrogen gas, i.e., an inert gas, atmosphere, and then was ground in a dry state by a pin mill in nitrogen gas i.e., an inert gas, atmosphere so as to obtain an alloy powder having a mean diameter of about 40 micrometers.

The particle size distribution of the powders was measured by a laser diffraction and scattering method.

[Test Cell]

After mixing 0.25 g of the resulting alloy powder and 0.75 g of nickel powder as an electroconductive material, a pellet having a diameter of 12 mm was prepared by pressing the mixture with a total force of 5 tons.

The pellet was formed into a test negative electrode according to the method described in JIS H 7205.

Namely, after sandwiching the pellet between nickel meshes having a mesh number of 60, the periphery of the nickel meshes was spot-welded to secure the pellet. A nickel plate was then welded to the nickel meshes.

A nickel hydroxide electrode the electric capacity of which was three times that of the negative electrode was prepared as a positive electrode.

In order to prepare a test cell, the negative electrode, the positive electrode, and a Hg/HgO electrode as a reference electrode were immersed into a KOH solution, the content of which was 6 to 6.5 mol/L (its specific gravity was 1.26 to 1.27 g/cm$^3$).

The initial temperature of the test cell was 20° C.

[Initial Characteristics and Activation of Electrodes]

The above-described test cell was connected to a charging and discharging testing instrument, which was a product of Toyo System Co., Ltd., and the following charging and discharging process was performed 10 times at 20° C. to fully activate the test electrodes:

Charging: 0.3 C×120%,

Standing: 0.5 hours, and

Discharging: 0.3 C at the cut-off voltage of 0.7 V vs. Hg/HgO.

The discharge capacity for the first cycle was defined as the initial capacity (mAh/g).

The ratio of the initial capacity of a test cell of an example to the initial capacity of a test cell of the corresponding comparative example was defined as the initial characteristics of the example.

[High-Rate Discharge Characteristics]

After the above-described activation of the electrodes, the following charging and discharging process was performed at 20° C.:

Charging: 0.3 C×120%,

Standing: 0.5 hours, and

Discharging: 3 C at the cut-off voltage of 0.7 V vs. Hg/HgO.

The discharge capacity in this process was defined as the high-rate capacity (mAh/g).

The ratio of the high-rate capacity of a test cell of an example to the high-rate capacity of a test cell of the corresponding comparative example was defined as the high-rate discharge characteristics of the example.

[Low-Temperature Discharge Characteristics]

After measurement of the above-described high-rate capacity, charging at 0.3 C×120% was performed at 20° C. The test cell was then maintained at −10° C. for 5 hours so as to ensure that the temperature of the test cell was −10° C.

Discharge was then performed at 0.3 C at the cut-off voltage of 0.7 V vs. Hg/HgO.

The capacity of this discharge was defined as the low-temperature capacity (mAh/g).

The ratio of the low-temperature capacity of a test cell of an example to the low-temperature capacity of a test cell of the corresponding comparative example was defined as the low-temperature discharge characteristics of the example.

[Plateau Pressure]

The hydrogen equilibrium pressure (MPa) when H/M was 0.5 in a discharge cycle on a PCT (Pressure-Composition-Temperature) curve measured at 40° C., which curve indicates the charge-discharge characteristics of hydrogen, was defined as the plateau pressure.

TABLE 1

| | c/d | a | b | c | d | a + b + c + d | Initial (%) | Low-temp. (%) | High-rate (%) | Plateau Pressure (MPa) |
|---|---|---|---|---|---|---|---|---|---|---|
| Example 1 | 1.67 | 4.20 | 0.35 | 0.50 | 0.30 | 5.35 | 122 | 125 | 113 | 0.029 |
| Comp. Ex. 1 | 0.60 | 4.20 | 0.35 | 0.30 | 0.50 | 5.35 | 100 | 100 | 100 | 0.030 |
| Example 2 | 1.22 | 4.15 | 0.30 | 0.55 | 0.45 | 5.45 | 112 | 120 | 109 | 0.028 |
| Comp. Ex. 2 | 0.82 | 4.15 | 0.30 | 0.45 | 0.55 | 5.45 | 100 | 100 | 100 | 0.032 |
| Example 3 | 1.00 | 4.30 | 0.25 | 0.35 | 0.35 | 5.25 | 105 | 110 | 103 | 0.031 |
| Comp. Ex. 3 | 0.75 | 4.30 | 0.25 | 0.30 | 0.40 | 5.25 | 100 | 100 | 100 | 0.034 |
| Example 4 | 1.00 | 4.40 | 0.20 | 0.35 | 0.35 | 5.30 | 109 | 112 | 105 | 0.031 |

TABLE 1-continued

|  | c/d | a | b | c | d | a+b+c+d | Initial (%) | Low-temp. (%) | High-rate (%) | Plateau Pressure (MPa) |
|---|---|---|---|---|---|---|---|---|---|---|
| Comp. Ex. 4 | 0.75 | 4.40 | 0.20 | 0.30 | 0.40 | 5.30 | 100 | 100 | 100 | 0.036 |
| Example 5 | 1.14 | 4.40 | 0.15 | 0.40 | 0.35 | 5.30 | 106 | 107 | 104 | 0.029 |
| Comp. Ex. 5 | 0.88 | 4.40 | 0.15 | 0.35 | 0.40 | 5.30 | 100 | 100 | 100 | 0.032 |
| Ref. Ex. 1-1 | 1.53 | 3.92 | 0.75 | 0.26 | 0.17 | 5.10 | 92 | 94 | 98 | 0.034 |
| Ref. Ex. 1-2 | 0.72 | 3.92 | 0.75 | 0.18 | 0.25 | 5.10 | 100 | 100 | 100 | 0.037 |
| Ref. Ex. 2-1 | 1.35 | 3.88 | 0.75 | 0.27 | 0.20 | 5.10 | 88 | 91 | 94 | 0.034 |
| Ref. Ex. 2-2 | 0.88 | 3.88 | 0.75 | 0.22 | 0.25 | 5.10 | 100 | 100 | 100 | 0.035 |

Each value of the initial, low-temperature, and high-rate discharge characteristics of Examples 1 to 5 and Reference Examples 1-1 and 2-1 was calculated from the electrochemical capacity of Comparative Examples 1 to 5 and Reference Example 1-2 and 2-2, respectively, which had a value of 100.

The compositions of rare earth metals described as R were the same for Example 1 and Comparative Example 1, for Example 2 and Comparative Example 2, for Example 3 and Comparative Example 3, for Example 4 and Comparative Example 4, for Example 5 and Comparative Example 5, for Reference Example 1-1 and Reference Example 1-2, and for Reference Example 2-1 and Reference Example 2-2.

As shown in Table 1, when the molar ratio of Co, i.e., "b" was in the range of 0.15 to 0.35 and the molar ratio of Al, i.e., "c" and the molar ratio of Mn, i.e., "d" satisfied the relationship $1 \leq c/d \leq 1.7$, the hydrogen-absorbing alloy exhibited not only excellent high-rate discharge characteristics but also excellent initial and low-temperature discharge characteristics, and hence the alloy was suitable for application to hybrid electric vehicles.

INDUSTRIAL APPLICABILITY

According to the present invention, a Ni/MH battery having excellent basic characteristics as a whole can be provided.

Therefore, a battery according to the present invention can be used for many applications such as for electric power sources of portable electric apparatuses, power tools, and automobiles.

In particular, a battery according to the present invention is preferable for large and prismatic Ni/MH batteries which power electric motors of hybrid electric vehicles.

The invention claimed is:

1. A hydrogen-absorbing alloy for hybrid electric vehicles which is an $AB_5$-type alloy having a $CaCu_5$-type crystal structure, characterized by having the general formula $RNi_aCo_bAl_cMn_d$ (R: mixture of rare earth metals), wherein $4.15 \leq a \leq 4.4$, $0.15 \leq b \leq 0.35$, $1 \leq c/d \leq 1.7$, $5.25 \leq a+b+c+d \leq 5.45$.

2. A hydrogen-absorbing alloy for hybrid electric vehicles which is an $AB_5$-type alloy having a $CaCu_5$-type crystal structure, characterized by having the general formula $RNi_aCo_bAl_cMn_d$ (R: mixture of rare earth metals), wherein $4.15 \leq a \leq 4.4$, $0.20 \leq b \leq 0.35$, $1 \leq c/d \leq 1.7$, $5.30 \leq a+b+c+d \leq 5.45$.

3. An electrode for a nickel-metal hydride secondary battery characterized by comprising the hydrogen-absorbing alloy according to claim 1.

4. A negative electrode for the nickel-metal hydride secondary battery which drive electric motors of hybrid electric vehicles comprising the electrode according to claim 3, wherein the hydrogen-absorbing alloy of the electrode absorbs and discharges hydrogen for the nickel-metal hydride secondary battery.

5. A nickel-metal hydride secondary battery characterized by comprising the negative electrode according to claim 4.

6. A drive arrangement for a hybrid electric vehicle characterized by comprising a nickel-metal hydride secondary battery according to claim 5 and an electric motor for driving the vehicle.

7. A hybrid electric vehicle characterized by comprising a drive arrangement according to claim 6.

* * * * *

UNITED STATES PATENT AND TRADEMARK OFFICE
CERTIFICATE OF CORRECTION

PATENT NO.         : 8,377,374 B2                             Page 1 of 1
APPLICATION NO.    : 12/525000
DATED              : February 19, 2013
INVENTOR(S)        : Kojima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

First Day of September, 2015

Michelle K. Lee
*Director of the United States Patent and Trademark Office*